United States Patent
Ohno et al.

(10) Patent No.: US 8,321,493 B2
(45) Date of Patent: Nov. 27, 2012

(54) FIELD DEVICE AND SYSTEM EMPLOYING THE SAME

(75) Inventors: Takeshi Ohno, Musashino (JP); Akira Noguchi, Musashino (JP); Akira Nagashima, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 749 days.

(21) Appl. No.: 11/791,187

(22) PCT Filed: Oct. 4, 2005

(86) PCT No.: PCT/JP2005/018355
§ 371 (c)(1),
(2), (4) Date: May 17, 2007

(87) PCT Pub. No.: WO2006/054401
PCT Pub. Date: May 26, 2006

(65) Prior Publication Data
US 2007/0282939 A1 Dec. 6, 2007

(30) Foreign Application Priority Data
Nov. 17, 2004 (JP) .................................. 2004-333277

(51) Int. Cl.
G06F 15/16 (2006.01)
G06F 15/177 (2006.01)
G06F 15/173 (2006.01)
G06F 9/46 (2006.01)
(52) U.S. Cl. ........ 709/201; 709/222; 709/223; 709/224; 709/225; 718/102; 718/103; 718/104
(58) Field of Classification Search .......... 718/100–108; 712/37; 702/182; 709/201, 222–225
See application file for complete search history.

(56) References Cited

U.S. PATENT DOCUMENTS

| 5,307,495 A * | 4/1994 | Seino et al. | 718/106 |
| 5,487,170 A * | 1/1996 | Bass et al. | 710/244 |
| 5,940,612 A * | 8/1999 | Brady et al. | 718/103 |
| 6,044,305 A * | 3/2000 | Larson et al. | 700/87 |
| 6,047,222 A * | 4/2000 | Burns et al. | 700/79 |
| 6,298,377 B1 * | 10/2001 | Hartikainen et al. | 709/223 |
| 6,317,701 B1 * | 11/2001 | Pyotsia et al. | 702/188 |
| 6,424,872 B1 * | 7/2002 | Glanzer et al. | 700/18 |
| 6,442,436 B1 * | 8/2002 | Nogami | 700/19 |

(Continued)

FOREIGN PATENT DOCUMENTS
JP 5-189389 A 7/1993
(Continued)

OTHER PUBLICATIONS

English translation of International Preliminary Report on Patentability issued May 31, 2007 for International Application No. PCT/JP2005/018355.

(Continued)

*Primary Examiner* — Catherine Thiaw
(74) *Attorney, Agent, or Firm* — Sughrue Mion, PLLC

(57) ABSTRACT

A field device connected to a network includes: a storage section; a communication section for performing communication via the network; and an arithmetic control section for controlling the field device entirely by executing a main task under an execution environment, and controlling an operation mechanism that operates under the execution environment. The operation mechanism assigns a group identifier, a unique address space and a unique name space to an additional task being started.

13 Claims, 17 Drawing Sheets

U.S. PATENT DOCUMENTS

| | | | | |
|---|---|---|---|---|
| 6,618,745 | B2 * | 9/2003 | Christensen et al. | 709/201 |
| 6,687,257 | B1 * | 2/2004 | Balasubramanian | 370/429 |
| 6,687,698 | B1 * | 2/2004 | Nixon et al. | 707/10 |
| 7,020,532 | B2 * | 3/2006 | Johnson et al. | 700/89 |
| 7,028,299 | B1 * | 4/2006 | Chang | 718/104 |
| 7,039,917 | B2 * | 5/2006 | Lister et al. | 718/107 |
| 7,093,244 | B2 * | 8/2006 | Lajoie et al. | 717/168 |
| 7,143,153 | B1 * | 11/2006 | Black et al. | 709/223 |
| 7,146,230 | B2 * | 12/2006 | Glanzer et al. | 700/83 |
| 7,302,686 | B2 * | 11/2007 | Togawa | 718/103 |
| 7,317,952 | B2 * | 1/2008 | Bhandiwad et al. | 700/17 |
| 7,342,897 | B1 * | 3/2008 | Nader et al. | 370/255 |
| 7,356,580 | B1 * | 4/2008 | Huang et al. | 709/224 |
| 7,418,704 | B2 * | 8/2008 | Hayashi | 718/100 |
| 7,565,651 | B1 * | 7/2009 | Carey | 718/100 |
| 7,703,093 | B2 * | 4/2010 | Fischer et al. | 717/177 |
| 7,792,953 | B2 * | 9/2010 | Cassara' et al. | 709/224 |
| 8,032,340 | B2 * | 10/2011 | Miller | 703/2 |
| 2003/0014529 | A1 * | 1/2003 | Simpson et al. | 709/229 |
| 2003/0212494 | A1 * | 11/2003 | Alexander et al. | 702/5 |
| 2004/0111499 | A1 * | 6/2004 | Dobrowski et al. | 709/222 |
| 2004/0205301 | A1 * | 10/2004 | Hara et al. | 711/137 |
| 2005/0066104 | A1 * | 3/2005 | Train et al. | 710/305 |
| 2005/0097194 | A1 * | 5/2005 | Eisenbeis et al. | 709/221 |
| 2006/0004944 | A1 * | 1/2006 | Vij et al. | 711/6 |
| 2006/0090160 | A1 * | 4/2006 | Forsythe et al. | 718/100 |
| 2007/0067767 | A1 * | 3/2007 | Da Silva Neto | 717/174 |
| 2007/0088518 | A1 * | 4/2007 | Braun | 702/108 |
| 2007/0118835 | A1 * | 5/2007 | Halleck et al. | 718/100 |

FOREIGN PATENT DOCUMENTS

| | | |
|---|---|---|
| JP | 6-231022 | 8/1994 |
| JP | 10-215492 | 8/1998 |
| JP | 11-119808 A | 4/1999 |
| JP | 2001-51716 | 2/2001 |
| JP | 2002-318702 | 10/2002 |
| JP | 2003-58408 | 2/2003 |
| JP | 2003-202929 A | 7/2003 |
| JP | 2004-54803 | 2/2004 |
| JP | 2004-078936 A | 3/2004 |
| JP | 2004-151941 A | 5/2004 |
| JP | 2004-215064 A | 7/2004 |
| JP | 2004-220197 A | 8/2004 |

OTHER PUBLICATIONS

Ferreira, et al., "Distribution and Persistance in Multiple and Heterogeneous Address Spaces," IEEE, pp. 83-93 (1993).

Barkai, "Technologies for Sharing and Collaborating on the Net," IEEE, pp. 13-28 (2002).

International Search Report dated Dec. 27, 2005 for PCT/JP2005/018355.

Excerpt from Technical Overview: Foundation Fieldbus, Fiedlbus Foundation.

* cited by examiner

FIG. 5

| GROUP IDENTIFIER | LIST OF BELONGING ADDITIONAL TASK |
|---|---|
| 1 | ADDITIONAL TASK IDENTIFIER = 2, 5 |
| 2 | ADDITIONAL TASK IDENTIFIER = 3 |
| 3 | ADDITIONAL TASK IDENTIFIER = 1, 4, 6 |
| ⋮ | ⋮ |

FIG. 13

| USER IDENTIFIER | USER AUTHENTICATION | | GROUP IDENTIFIER OF OPERATIONAL OBJECT | AUTHORIZED OPERATION |
|---|---|---|---|---|
| | USER NAME | PASSWORD | | |
| 1 | tanaka | aaaaa | 1 | CREAT, START, HALT, DELETE |
| 2 | sato | bbbbb | 1, 2, 3 | START, HALT |
| 3 | ito | ccccc | 1, 3 | HALT |
| .. | .. | .. | .. | .. |

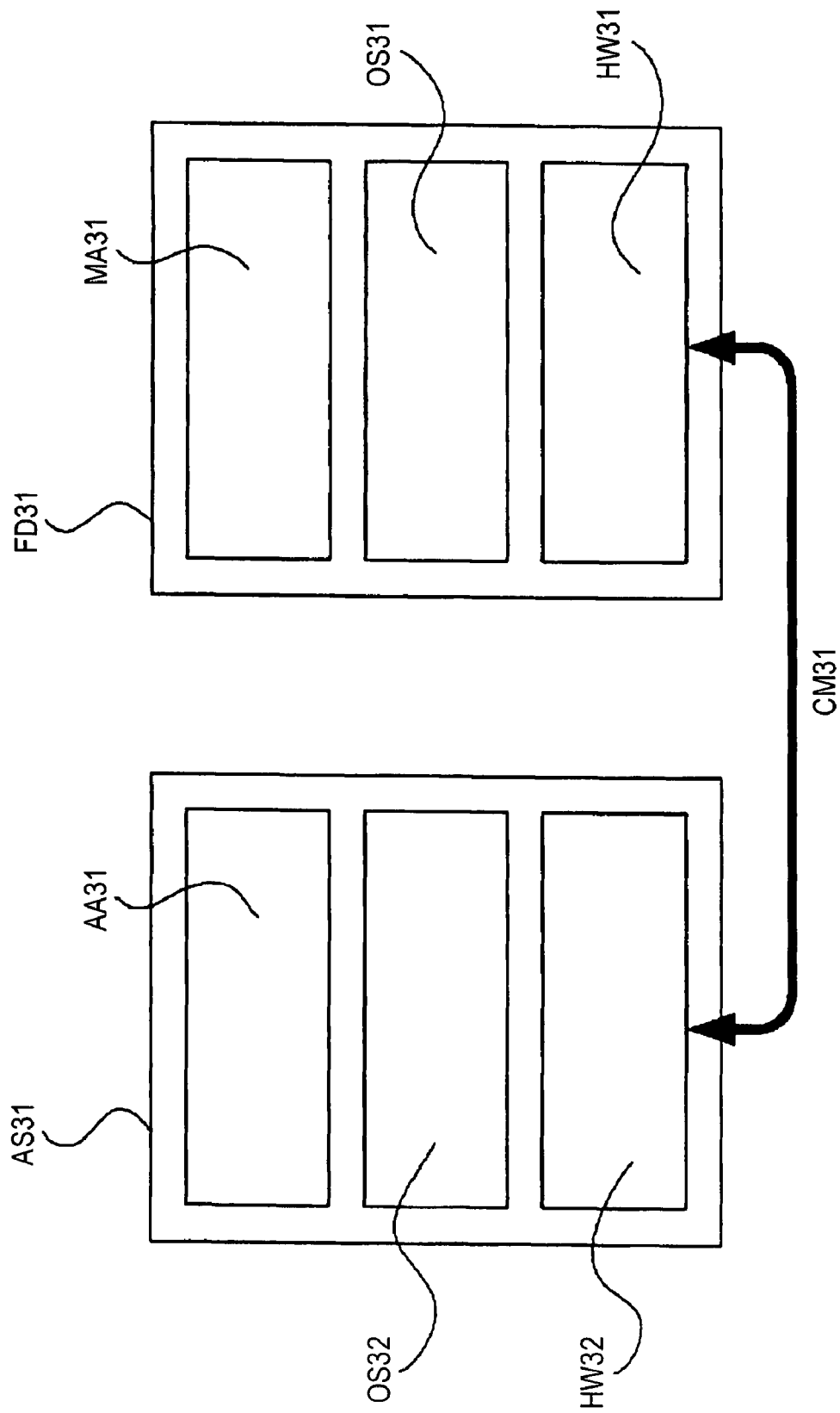

FIELD DEVICE AND SYSTEM EMPLOYING THE SAME

TECHNICAL FIELD

The present invention relates to a field device and to a system in which a plurality of the field devices is connected to each other via a network. Particularly, the invention relates to a field device and to a system employing the same, in which a function (task) is easily added to the field device and the added functions (tasks) can be operated independently with each other.

BACKGROUND ART

JP-A-10-215492, JP-A-2001-051716, JP-A-2002-318702 and JP-A-2004-054803 are cited as technical documents related to the field device and the system in which a plurality of the field devices is connected to each other via a network.

FIG. 14 is a configuration block diagram showing one example of the system in which a plurality of the field devices of the related art such as a sensor, an actuator, a controller, a communication measuring instrument, a measuring instrument, a recording device and a server, is connected to each other via a network. In FIG. 14, reference numeral 1 is a higher server; reference numerals 2, 3, 4, and 5 are controllers; and reference numeral 6 is a sensor group formed of a plurality of sensors.

In FIG. 14, a plurality of sensors shown as "SN01" is connected to the controller 2 via a network (not shown), and a plurality of sensors shown as "SN02" is connected to the controller 3 via the network (not shown).

In the same manner, in FIG. 14, a plurality of sensors shown as "SN03" is connected to the controller 4 via the network (not shown), and a plurality of sensors shown as "SN04" is connected to the controller 5 via the network (not shown).

The controllers 2, 3, 4, and 5 are connected to the higher server 1 via the network (not shown).

Here, an operation of the related art example shown in FIG. 14 will be briefly described herein. An operation of the sensor group 6 is controlled by the controllers 2, 3, 4, and 5 respectively, and the controllers 2, 3, 4, and 5 are centrally managed by the server 1, thereby forming a system in total, for example, a manufacturing system and the like.

In the system shown in FIG. 14, in a case of adding a function for solving a user's new request, task, etc., (hereinafter, referred to as an 'additional task') to a function currently running in the field device such as the controller or the server (hereinafter, described as a 'main task'), the additional task may be executed in the same execution environment as that of the main task by adding a program or a parameter, etc., to the field device such as the controller or the server.

FIG. 15 is an explanatory diagram showing a relation between the main task operated in a field device (specifically, an application program), and an execution environment for executing the main task such as an OS (Operating System) or hardware resources such as a communication function, I/O, and the like. The main task, the execution environment, and the hardware resources are unique functions of the field device and hereinafter, these functions are described as a 'device-unique function' if necessary. "HW11" in FIG. 15 is hardware resources; "OS11" in FIG. 15 is an execution environment; "MA11" in FIG. 15 is a main task; and "AA11", "AA12" and "AA13" in FIG. 15 are additional tasks (specifically, the application program).

For example, in a case of adding a group of a plurality of additional tasks (specifically, "AA11", "AA12", and "AA13") as shown as "AA01" in FIG. 14 to the server 1 and the controllers 2 and 3, each additional task shown as "AA11", "AA12", and "AA13" in FIG. 15 is incorporated into the main task shown as "MA11" in FIG. 15

By such configuration, the additional task shown as "AA11", "AA12", and "AA13" in FIG. 15 can be added to the field device to be executed. Particularly, in the example of the related art example shown in FIG. 14, the additional task can be executed in the same execution environment as that of the main task by using the device-unique function (main task, execution environment, and hardware resources).

FIG. 16 is a configuration block diagram showing another example of the system of the related art in which a plurality of the field devices is connected to each other via a network. In FIG. 16, reference numeral 7 is a higher server; reference numerals 8, 9, 10, and 11 are controllers; reference numeral 12 is a sensor group formed of a plurality of sensors; and reference numerals 13, 14, and 15 are application servers.

A plurality of sensors shown as "SN21" in FIG. 16 is connected to the controller 8 via a network (not shown), and a plurality of sensors shown as "SN22" in FIG. 16 is connected to the controller 9 via the network (not shown).

In the same manner, a plurality of sensors shown as "SN23" in FIG. 16 is connected to the controller 10 via the network (not shown), and a plurality of sensors shown as "SN24" in FIG. 16 is connected to the controller 11 via the network (not shown).

The controllers 8, 9, 10, and 11 are connected to the higher server 7 via the network (not shown). The application servers 13, 14, and 15 are connected to the respective field devices via the network (not shown).

Here, an operation of the related art example shown in FIG. 16 will be briefly described herein. An operation of the sensor group 12 is controlled by the controllers 8, 9, 10, and 11, and the controllers 8, 9, 10, and 11 are centrally managed by the server 7, thereby forming a system in total, for example, a manufacturing system and the like.

In the system shown in FIG. 16, in a case of adding the additional task to a main task currently running in the field device such as the controller or the server, the field device such as the controller or the server accesses to the application servers 13, 14, and 15 to receive required services of the additional task.

FIG. 17 is an explanatory diagram showing a relation between a main task operated in a field device, and an execution environment for executing the main task or hardware resources.

"AS31" in FIG. 17 is an application server providing services of the additional task, and "FD31" in FIG. 17 is a field device in which only the main task which receives the services of the additional task is operated.

"HW31" and "HW32" in FIG. 17 are hardware resources of the application server and the field device (specifically, communication means such as a network card); "OS31" and "OS32" in FIG. 17 are execution environments of the application server and the field device (specifically, a communication control function of an OS, and the like); "MA31" in FIG.17 is the main task of the field device; and "AA31" in FIG. 17 is the additional task operated in the application server.

For example, in a case of adding the additional task provided by the application server 13 to the plurality of sensors shown as "SN21" in FIG. 16, adding the additional task provided by the application server 14 to the server 7 and the controllers 8 and 9, and adding the additional task provided by the application server 15 to the plurality of sensors shown as "SN24" in FIG. 16 and the controller 11, each field device accesses to the corresponding application server via a network (not shown) to receive the services of the additional task.

Specifically, the field device shown as "FD31" in FIG. 17 uses the additional task shown as "AA31" in FIG. 17 operated on the device-unique function ("OS32" and "HW32" in FIG. 17) of the application server shown as "AS31" in FIG. 17 by performing communication shown as "CM31" in FIG. 17 by using the device-unique function ("OS31" and "HW31" in FIG. 17) of the field device.

By such configuration, the additional task shown as "AA31" in FIG. 17 can be added to the field device and executed. Particularly, in the related art example shown in FIG. 16, there is no limitation on an adding condition of the additional task, and it is possible to add the additional task without being influenced by the resource of the field device to which the additional task is added.

DISCLOSURE OF THE INVENTION

Problem that the Invention is to Solve

In the related art example shown in FIG. 14, however, there has been a problem that it is necessary to be fully aware of specification or implementation of the main task and a function of the execution environment such as OS, since the additional task and the main task are executed in the same operation environment. That is, since the device-unique function of each field device is various, the additional task is varied depending on the devices into which the additional task is incorporated even though the additional task has the same function.

Further, there has been a problem that it is extremely difficult to add the additional task without affecting the main task in the least because the additional task is incorporated into the running main task. That is, there has been a problem that other tasks may be influenced when the additional task (or the main task) is operated.

In the related art example shown in FIG. 16, since it is necessary to prepare the application servers to provide services of the additional task, there has been a problem that the application servers have to be prepared in correspondence with the number of the additional tasks to be added.

In addition, depending on the type of the additional task, specifically, in a case of making the application server execute the additional task which is required to collect data in a very short time, such as an anomaly analysis process, there has been a problem that the main task of the field device such as sensor is influenced by CPU (Cetral Processing Unit) load of the field device such as the sensor as the data collection target or network load.

An object of the present invention is to provide a field device and a system employing the field device, in which a function (task) is easily added to the field device, and the added functions (tasks) can be operated independently with each other.

Means for Solving the Problem

There is provided a field device connected to a network, the field device comprising:
a storage section;
a communication section for performing communication via the network; and
an arithmetic control section for controlling the field device entirely by executing a main task under an execution environment, and controlling an operation mechanism that operates under the execution environment,
wherein the operation mechanism assigns a group identifier, a unique address space and a unique name space to an additional task being started.

For this reason, the running additional tasks can be independently operated without interfering with each other. In addition, an influence on the main task caused by an operation of the additional task can be avoided.

In the field device, the operation mechanism controls the additional task being started. For this reason, the running additional tasks can be independently operated without interfering with each other. In addition, an influence on the main task caused by the operation of the additional task can be avoided.

In the field device, the operation mechanism specifies an access destination in a device-unique function in response to a request from the running additional task, for reading data held by the device-unique function,
when the main task is accessing the specified access destination, the operation mechanism waits until the access of the main task is completed, and
the operation mechanism reads out physical data from the access destination, converts the read physical data to logical data on the basis of a data conversion table, and transmits the converted logical data to the running additional task.

For this reason, an influence on the main task caused by an operation of the additional task can be avoided.

In the field device, the operation mechanism specifies an access destination in a device-unique function in response to a request from the running additional task, for writing in data held by the device-unique function, and converts logical data to write in to physical data on the basis of a data conversion table,
when the main task is accessing the specified access destination, the operation mechanism waits until the access of the main task is completed, and
the operation mechanism writes the converted physical data in the specified access destination.

For this reason, the influence on the main task caused by the operation of the additional task can be avoided.

In the field device, the device-unique function includes hardware resources, the main task, and the execution environment. For this reason, the additional tasks being started can be independently operated without interfering with each other. In addition, the influence on the main task caused by the operation of the additional task can be avoided.

In the field device, the operation mechanism acquires a group identifier of other additional task in response to an operation request from the running additional task to the other additional task,
when the group identifier of the running additional task and the group identifier of the other additional task are the same, the operation mechanism transmits the operation request to the other additional task, and
when the group identifier of the running additional task and the group identifier of the other additional task are not the same, the operation mechanism does not permit the operation request.

For this reason, independence among different group identifiers can be secured.

In the field device, the execution environment provides priority order to the main task and the operation mechanism. For this reason, the influence on the main task caused by the operation of the additional task can be avoided.

In the field device, the operation mechanism provides priority order to each group identifier. For this reason, it is possible to control the priority in a virtual system unit.

In the field device, the operation mechanism provides priority order to each additional task. For this reason, the additional tasks being started can be independently operated without interfering with each other.

In the field device, upon loading a new additional task, the operation mechanism prepares a different name space for each group identifier, and loads the new additional task into the name space to execute the task. For this reason, the new additional task can be used independently among the group identifiers, thereby the independence among the virtual systems (different group identifiers) is further improved.

In the field device, upon providing the hardware resources to the additional task, the operation mechanism manages so as to use different resources of the hardware resources even though the same name is used between the additional tasks to which different group identifiers are assigned. For this reason, the independence among the virtual systems (different group identifiers) is further improved.

In the field device, when the additional task requests an access to a certain path name, the operation mechanism acquires the group identifier of the additional task and accesses by using an extended path name in which the group identifier is added to the path name. For this reason, the extended path name may be a completely different path name when the group identifier is different. Therefore, overlapping of the resources does not occur and the independence among the virtual systems (different group identifiers) can be further improved.

In the field device, the operation mechanism determines whether an operation request is proper or improper in response to the operation request from a user, and authenticates an access authority of the user. For this reason, it becomes possible to block the improper operation request from the user who does not have the access authority, thereby improving security.

The invention provides a field system comprising:

a plurality of the field devices, wherein the plurality of field devices is connected to a network, and the same group identifier is assigned to the plurality of field devices.

For this reason, the additional tasks being started can be independently operated without interfering with each other. In addition, the influence on the main task caused by the operation of the additional task can be avoided.

The field system includes a system management server which is connected to the network, and collectively manages authentication information. For this reason, it becomes unnecessary to individually manage the complicated authentication information in the field devices. In a case of changing the authentication information, only the authentication information of the system management server can be changed without changing the individual authentication information of the respective field devices.

Advantage of the Invention

According to the aforementioned field device, when an additional task is started, an operation mechanism assigns a group identifier and also assigns a unique address space and a unique name space to each additional task. For that reason, the started additional tasks can be independently operated without interfering with each other. In addition, the operation mechanism controls so that the address space to which the additional task is assigned is not directly operated, or the running additional tasks do not perform communication freely. For that reason, an influence on a main task caused by an operation of the additional task can be avoided.

In a case where the additional task accesses data in a device-unique function, the operation mechanism allows the main task to preferentially access the data. For that reason, the influence on the main task caused by the operation of the additional task can be avoided.

When there is an operation request from the running additional task to the other additional task, the operation mechanism permits the operation request only when the group identifier of the running additional task and the group identifier of the other additional task are the same. For this reason, the independence among different group identifiers can be secured.

By giving the priority order to the main task and the operation mechanism and changing assigned time for CPU or occupation right to resources, or the like, the priority order of the main task is set higher than the priority order of the operation mechanism. For that reason, the influence on the main task caused by the operation of the additional task can be avoided.

The operation mechanism gives the priority order to each group identifier, and thus it is possible to control the priority in a virtual system unit.

The operation mechanism gives the priority order to each additional task, and thus the started additional tasks can be independently operated without interfering with each other.

In a case where the new additional task is loaded, the operation mechanism prepares a different name space for each group identifier and loads the new additional task into the name space to execute the task. For this reason, the additional task can be used independently among the group identifiers, thereby further improving the independence among the virtual systems (different group identifiers).

In a case where the hardware resources is provided to the additional task, the operation mechanism manages so as to use different resources of the hardware resources even though the same name is used among the additional tasks to which the different group identifiers are assigned. For this reason, the independence among the virtual systems (different group identifiers) can be further improved.

In a case where the additional task requests an access to a certain path name, the operation mechanism acquires the group identifier of the additional task and accesses by using an extended path name in which the group identifier is added to the path name. For this reason, the extended path name becomes a completely different path name when the group identifier is different. Therefore, overlapping of resources does not occur and the independence among the virtual systems (different group identifier) can be further improved.

The operation mechanism authenticates the access authority of a user in response to an operation request from the user, and determines whether the operation request is proper or improper. For this reason, it is possible to block the improper operation request from the user who does not have the access authority, thereby improving security.

In addition, the invention provides a field system comprising a plurality of the field devices, wherein the plurality of field devices is connected to a network, and the same group identifier is assigned to the plurality of field devices. The field system includes a system management server which is connected to the network, and collectively manages authentication information. For this reason, it becomes unnecessary to individually manage the complicated authentication information for the field devices. In a case of changing the authentication information, only the authentication information of the system management server can be changed without changing the authentication information of the respective field devices.

BRIEF DESCRIPTION OF THE DRAWINGS

[FIG. 5] is an explanatory diagram showing one example of a group identifier management table.

[FIG. 13] is an explanatory diagram showing one example of authentication information managed in a system management server.

[FIG. 17] is an explanatory diagram showing relation among a main task operated in a field device, an execution environment for executing the main task and hardware resources.

Figure 1:
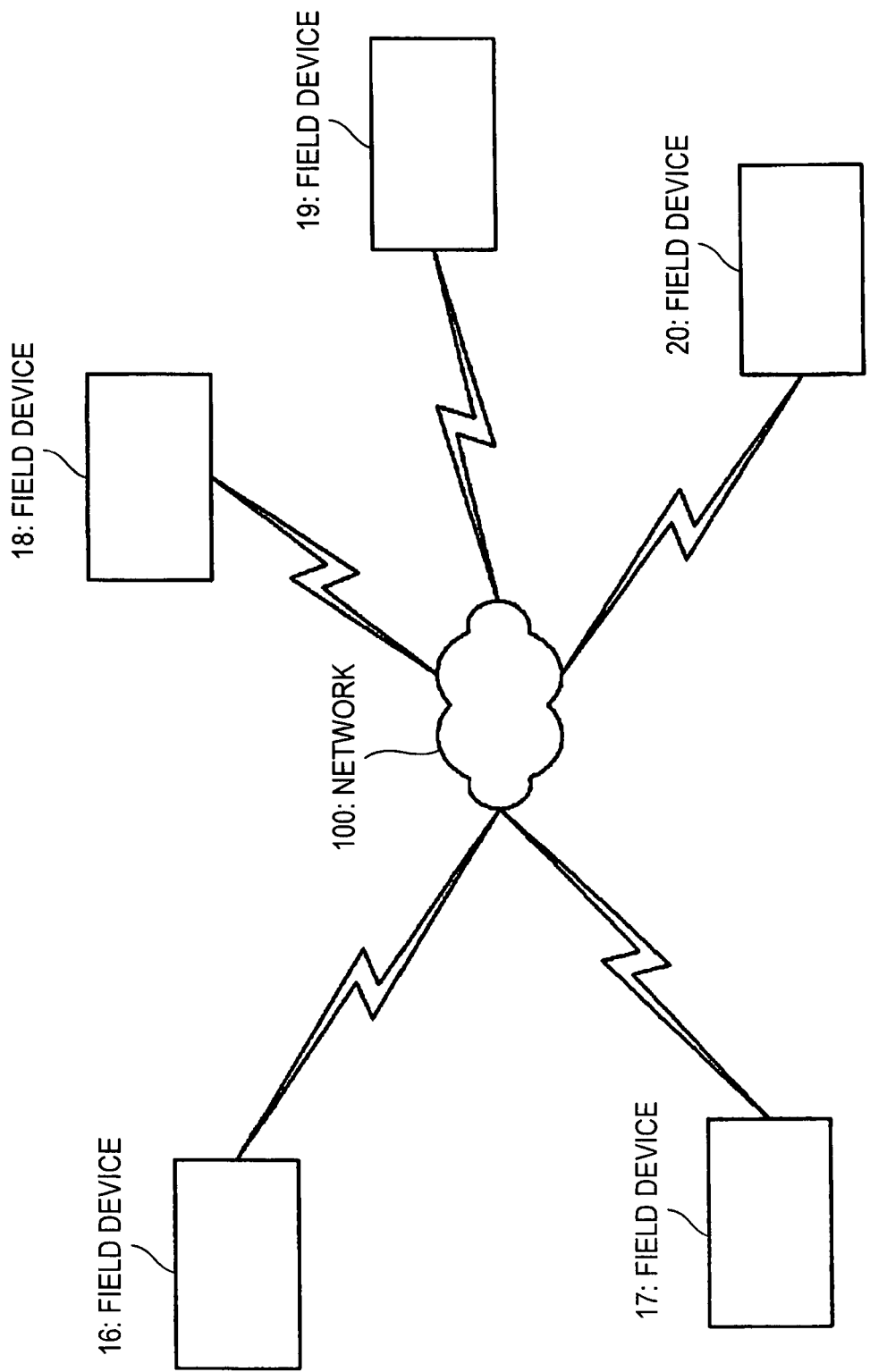
[FIG. 1] is a configuration block diagram showing one embodiment of a system employing a field device according to the present invention.

DESCRIPTION OF REFERENCE NUMERALS AND SIGNS 1, 7 SERVER
2, 3, 4, 5, 8, 9, 10, 11 CONTROLLER
6, 12 SENSOR GROUP
13, 14, 15 APPLICATION SERVER
16, 17, 18, 19, 20, 50 FIELD DEVICE
21 ARITHMETIC CONTROL SECTION
22 STORAGE SECTION
23 COMMUNICATION SECTION
24 SYSTEM MANAGEMENT SERVER
100 NETWORK

BEST MODE FOR CARRYING OUT THE INVENTION

Hereinafter, the present invention will be described in detail with reference to drawings. FIG. 1 is a configuration block diagram showing one embodiment of a system employing a field device according to the invention.

In FIG. 1, reference numerals 16, 17, 18, 19, and 20 are field devices such as a sensor, an actuator, a controller, a communication measuring instrument, a measuring instrument, a recording device and a server; and reference numeral 100 is a network. The field devices 16, 17, 18, 19, and 20 are connected to each other via the network 100.

Figure 2:
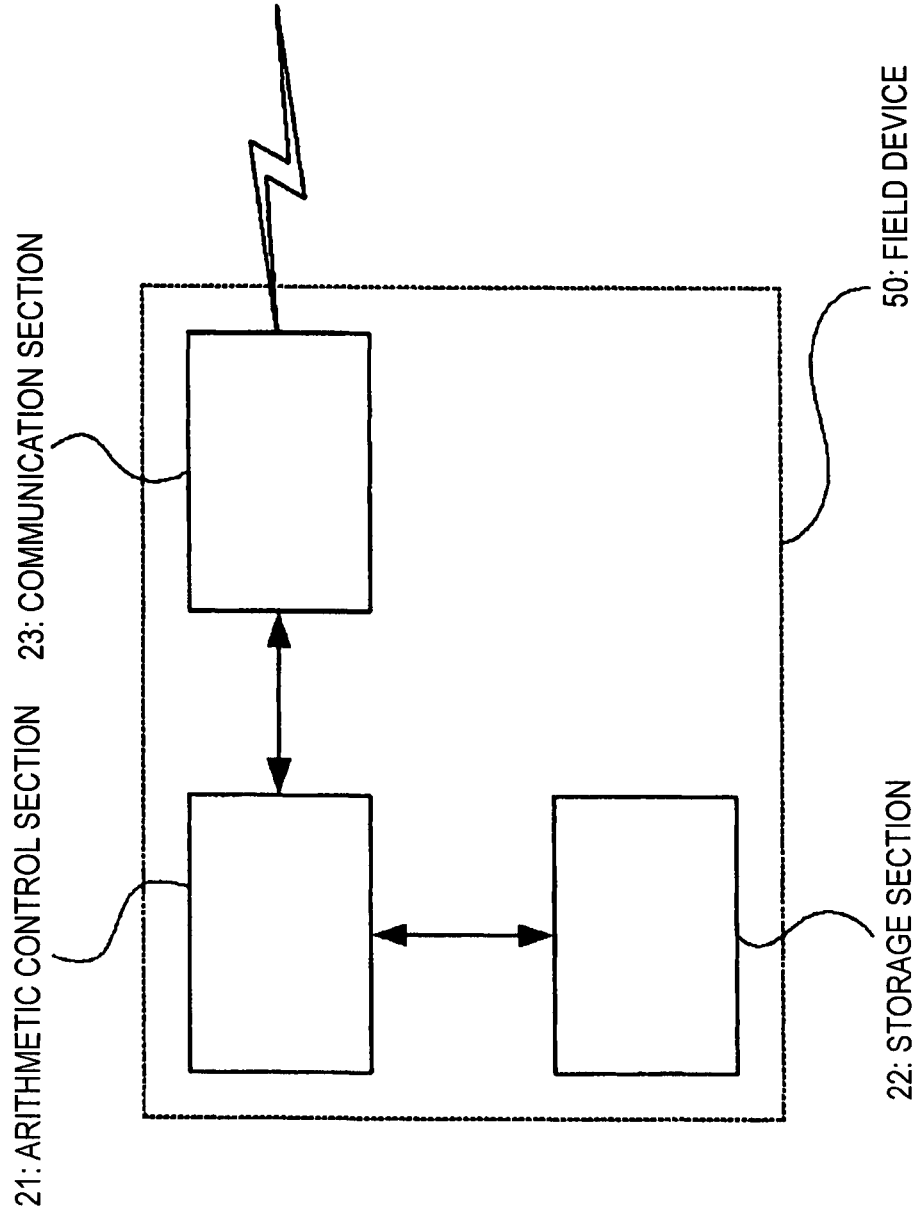
[FIG. 2] is a configuration block diagram showing a specific example of each field device.

FIG. 2 is a configuration block diagram showing a specific example of each field device. In FIG. 2, reference numeral 21 is an arithmetic control section such as CPU, controlling the entire field device; reference numeral 22 is a storage section in which an application program such as a main task is stored, such as a hard disk, ROM (Read Only Memory), RAM (Random Access Memory), a flash memory (electrically re-writable ROM); and reference numeral 23 is a communication section such as a network card, for communicating via a network. In addition, a field device 50 includes the reference numerals 21, 22, and 23.

Input and output of the storage section 22 are connected to the arithmetic control section 21, and also input and output of the communication section 23 are connected to the arithmetic control section 21. In addition, the communication section 23 is connected to the network (not shown).

Here, an operation of the embodiment shown in FIG. 1 will be described with reference to FIGS. 3, 4, 5, 6, 7, 8, 9, 10, and 11.

Figure 3:
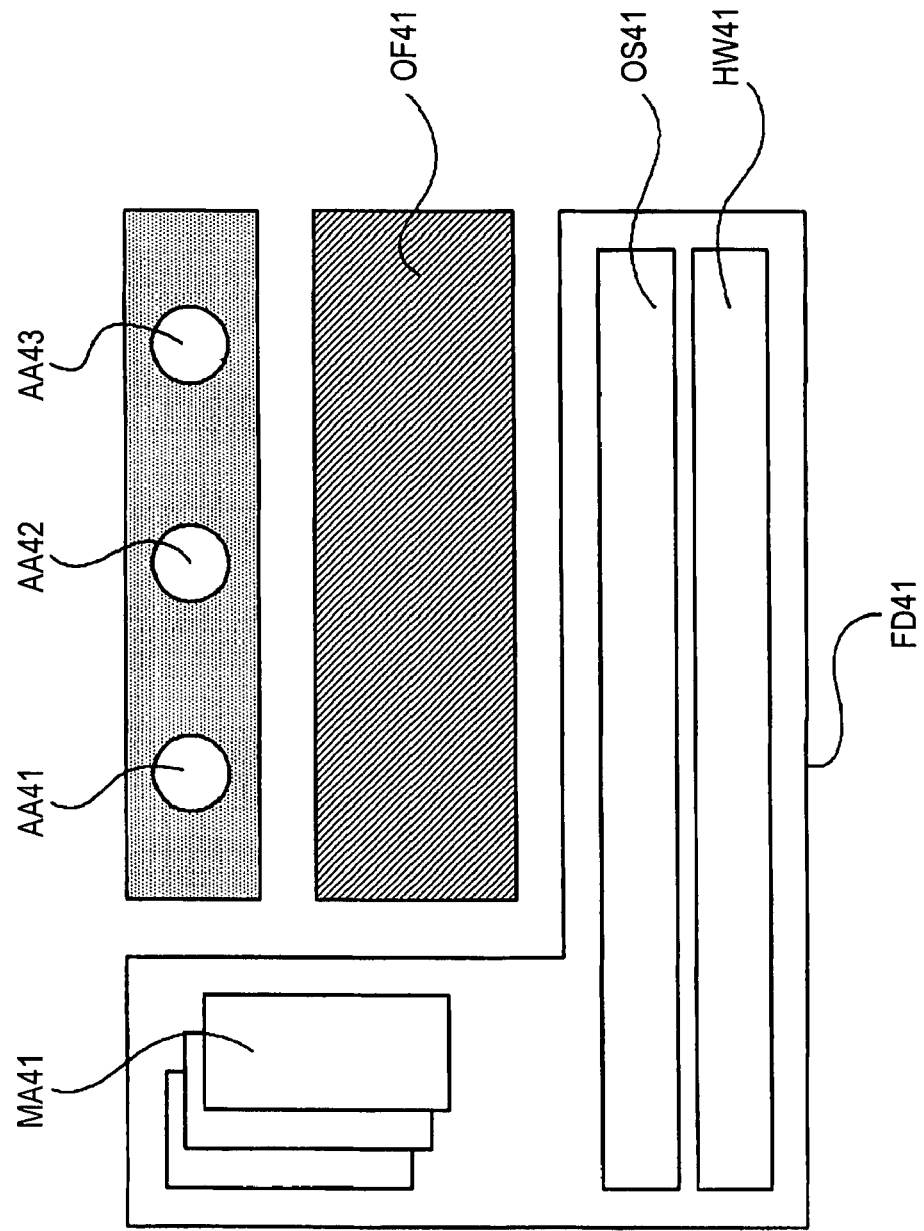
[FIG. 3] is an explanatory diagram showing a relation among a main task operated in a field device, an execution environment for executing the main task, hardware resources, an operation mechanism and an additional task.
Figure 9:
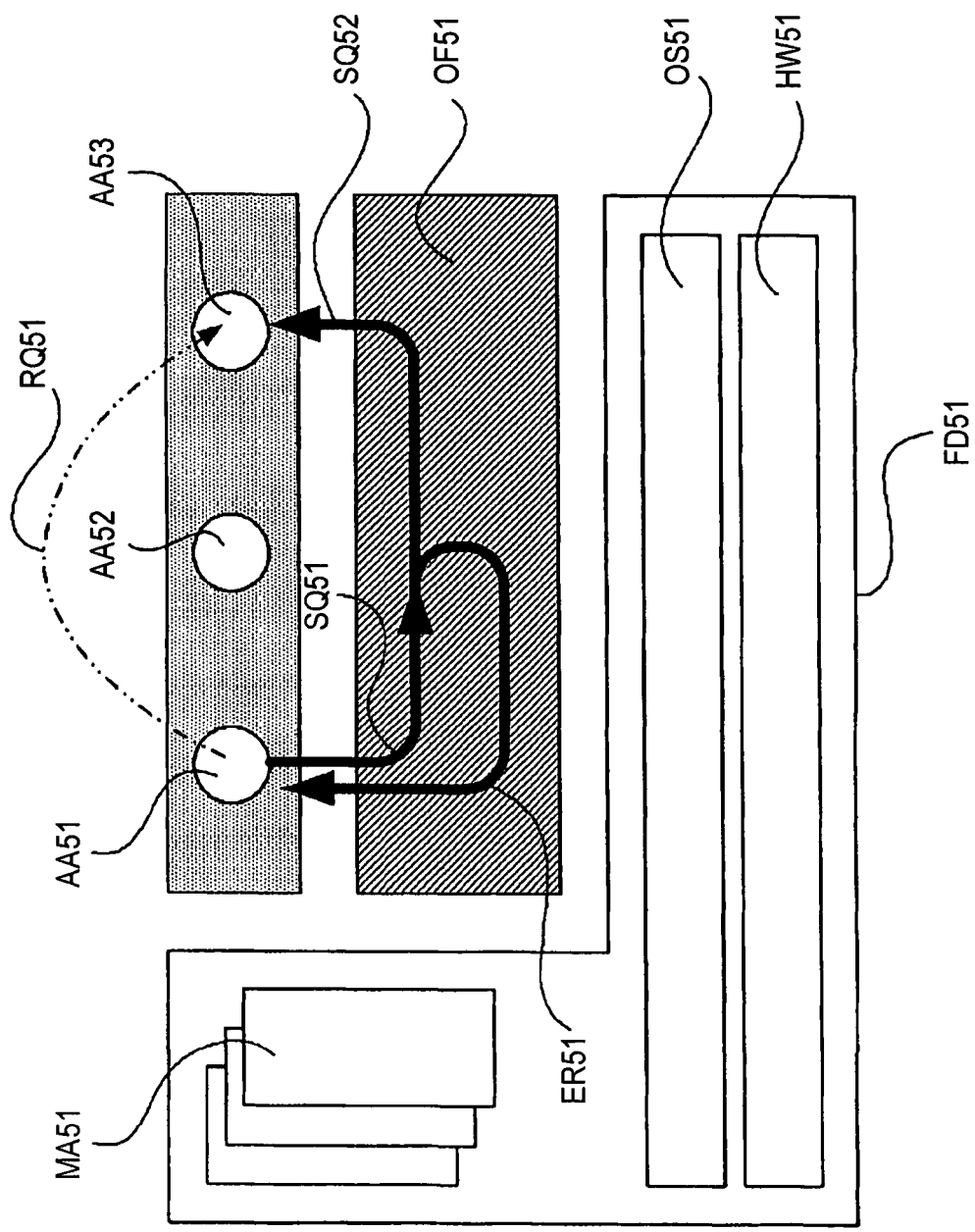
[FIG. 9] is an explanatory diagram describing an operation of other additional task.
Figure 10:
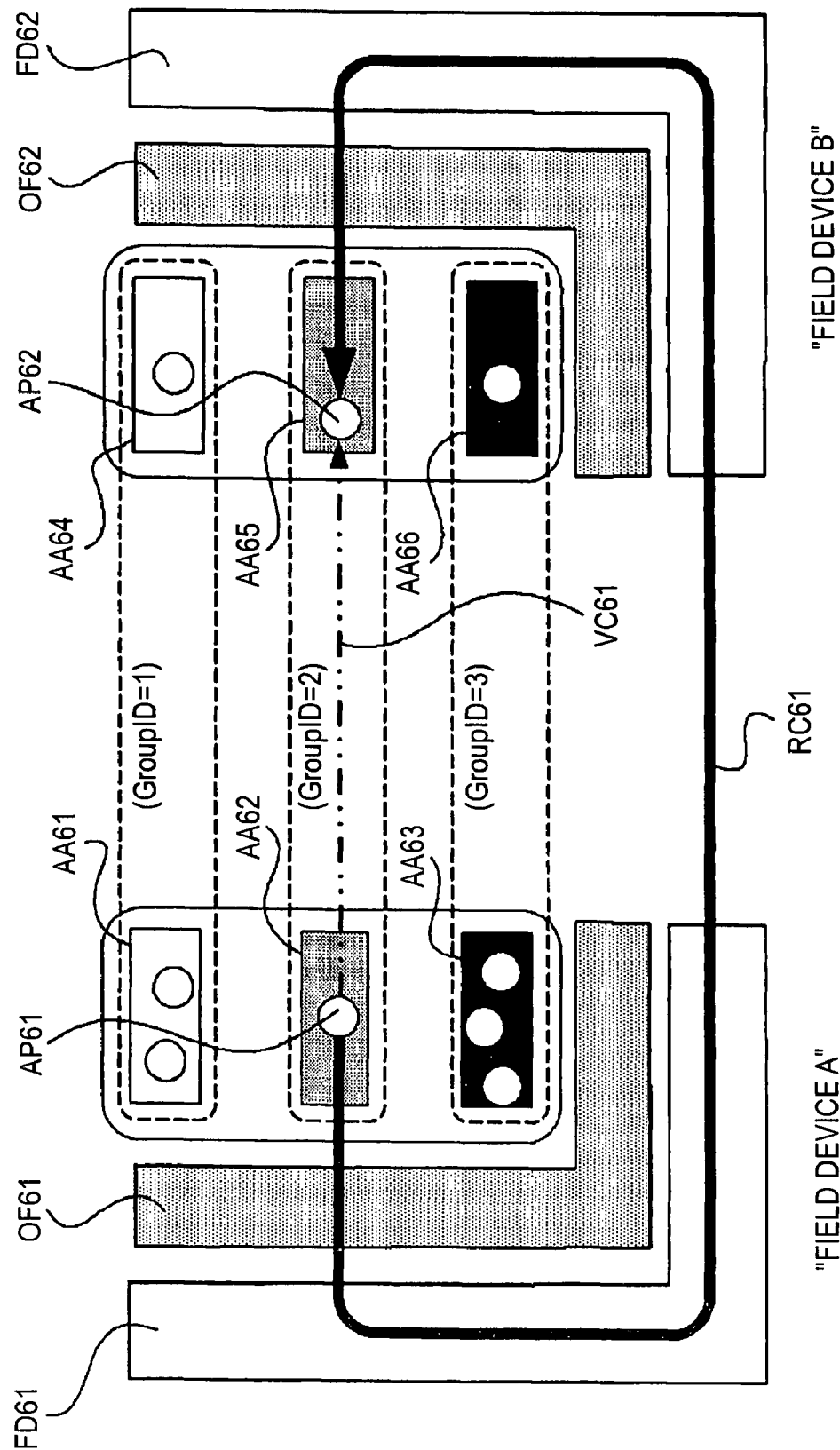
[FIG. 10] is an explanatory diagram describing an operation of additional task between different field devices.
Figure 11:
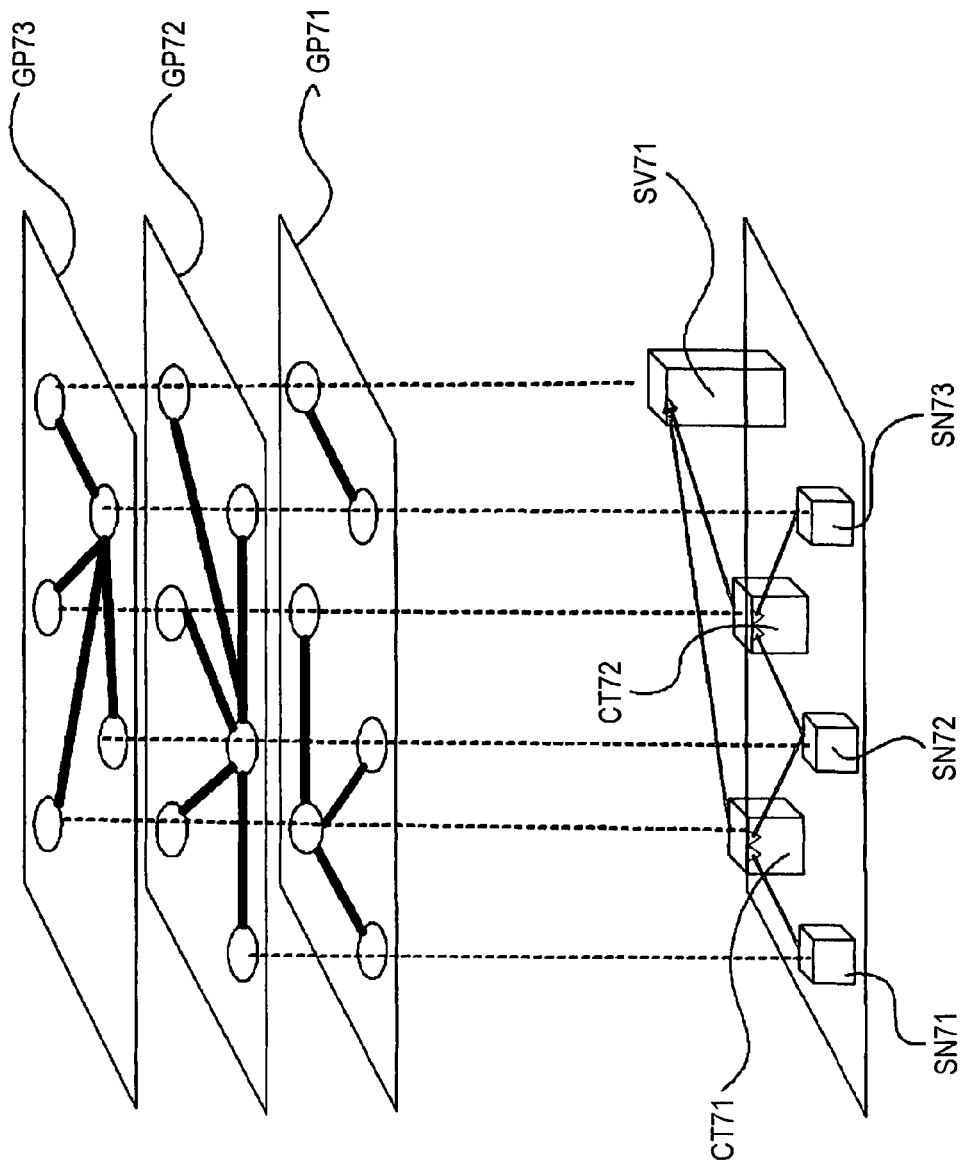
[FIG. 11] is an explanatory diagram describing a virtual system.

FIG. 3 is an explanatory diagram showing a relation among a main task operated in a field device (specifically, an application program), an execution environment for executing the main task such as an OS, hardware resources such as a communication function and I/O, an operation mechanism, and an additional task (specifically, an application program). FIGS. 4, 6, 7, and 8 are flow charts describing an operation of the operation mechanism. FIG. 5 is an explanatory diagram showing one example of a group identifier management table. FIG. 9 is an explanatory diagram describing an operation of other additional task. FIG. 10 is an explanatory diagram describing an operation of the additional task between different field devices. FIG. 11 is an explanatory diagram describing a virtual system.

In FIG. 3, "MA41" is a main task; "HW41" is hardware resources; "OS41" is an execution environment; "OF41" is an operation mechanism; "FD41" is a device-unique function; and "AA41", "AA42", and "AA43" are additional tasks.

The operation mechanism shown as "OF41" of FIG. 3 is installed in each field device, and executes the additional task shown as "AA41" of FIG. 3, etc. In addition, from a viewpoint of the execution environment (for example, an OS) shown as "OS41" of FIG. 3 included in the device-unique function of a field device 50. shown as "FD41" of FIG. 3, the operation mechanism shown as "OF41" of FIG. 3 is handled as a single independent execution unit such as a task or a process.

The operation mechanism shown as "OF41" of FIG. 3 has functions such as an execution function for executing the additional task; an interface function for the additional task to use the device-unique function including the main task operated in the field device, the execution environment for executing the main task and the hardware resources; an additional task management function which controls creation, start, halting and deletion of the additional task, and communication among the additional tasks; and a group management function which performs a group control of the additional tasks.

Figure 4:
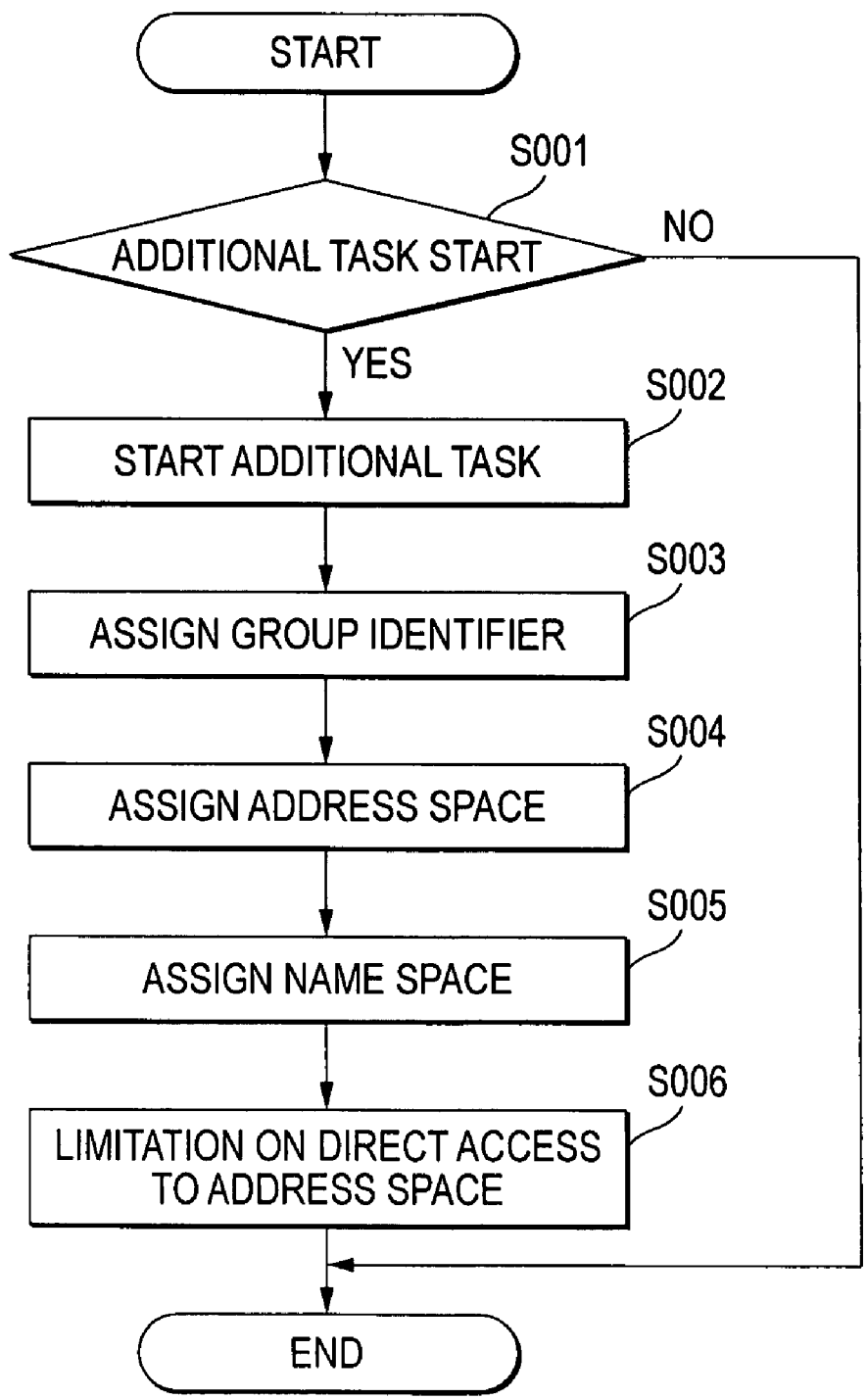
[FIG. 4] is a flow chart describing an operation of an operation mechanism.

In "S001" of FIG. 4, the operation mechanism ("OF41" of FIG. 3) determines whether or not to start the additional task (a created additional task or the additional task being halted in the present circumstances) In a case where the operation mechanism determines to start the additional task, the operation mechanism ("OF41" of FIG. 3) executes the additional task in "S002" of FIG. 4 and assigns a group identifier to the started additional task in "S00" of FIG. 4.

Here, the group identifier is an identifier used in managing a plurality of additional tasks on the basis of the group identifier assigned to the additional task and forming the virtual system described later, or the like. For example, as shown in FIG. 5, a list of the group identifiers, in which the additional tasks (specifically, additional task identifiers) that belong to the group identifiers are written, is managed by the operation mechanism ("OF41" of FIG. 3.)

In the list of the group identifiers, not only the group identifier corresponding to the additional task of a single field device but also the group identifiers corresponding to the additional tasks of the other relating field devices can be managed. The list of the group identifiers may be shared among a plurality of the field devices forming a system.

That is, in a step "S003" of FIG. 4, the operation mechanism ("OF41" of FIG. 3) searches the group identifier to which the additional task identifier of the started additional task in "S002" of FIG. 4 belongs, from the list of the group identifiers, and assigns the group identifier to the started additional task.

In "S004" of FIG. 4, the operation mechanism ("OF41" of FIG. 3) assigns a unique address space (for example, a region of a memory space which can be used by the additional task) to the started additional task.

In "S005" of FIG. 4, the operation mechanism ("OF41" of FIG. 3) assigns a unique name space (for example, a space which defines a name such as a variable name or a program name that the additional task uses, and the variable can be clearly distinguished even when the started additional task uses the variable same as that used in the other additional task because the name space is different) to the started additional task.

Finally, in "S006" of FIG. 4, the operation mechanism ("OF41" of FIG. 3) controls so that the address space to which the started additional task is assigned is not directly operated, or the running additional tasks do not perform communication freely between the running additional tasks.

As a result, when the additional tasks are started, the operation mechanism ("OF41" of FIG. 3) assigns the group identifiers, and the unique address space and the name space for each of the additional tasks. For that reason, the started additional tasks can be independently operated without interfering with each other.

In addition, since the operation mechanism ("OF41" of FIG. 3) controls so that the address space to which the additional task is assigned is not directly operated, or the running additional tasks do not perform communication freely between the running additional tasks, an influence on the main task caused by an operation of the additional task can be avoided.

Figure 6:
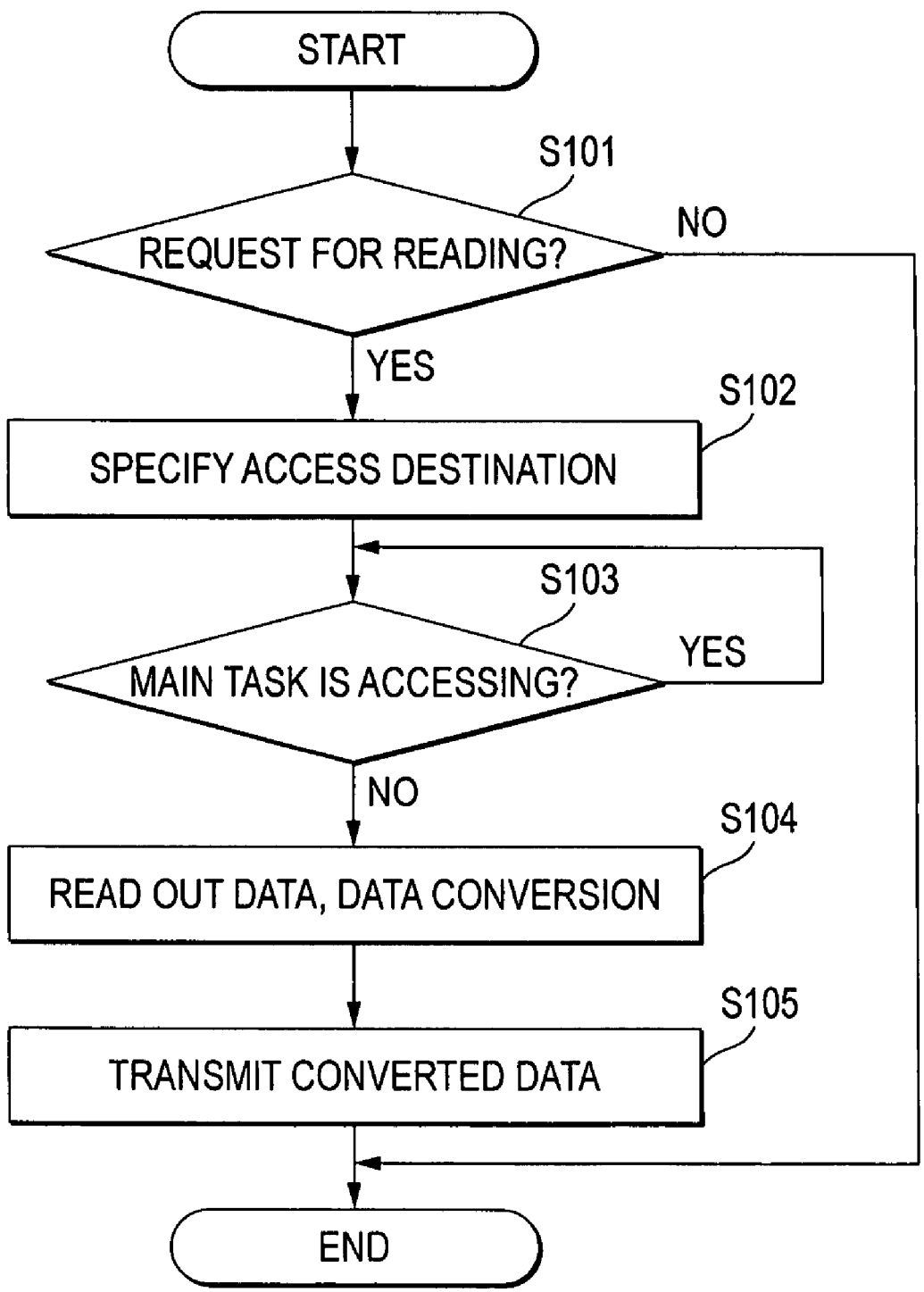
[FIG. 6] is a flow chart describing an operation of an operation mechanism.

In "S101" of FIG. 6, the operation mechanism ("OF41" of FIG. 3) determines whether or not there is a request for reading data, which the device-unique function ("FD41" of FIG. 3) has, from the running additional task. In a case where the operation mechanism determines that there is the request for reading, the operation mechanism ("OF41" of FIG. 3) specifies an access destination in the device-unique function ("FD41" of FIG. 3) in "S102" of FIG. 6.

More specifically, the operation mechanism ("OF41" of FIG. 3) has a data conversion table for physical data handled in the device-unique function ("FD41" of FIG. 3) and logical data handled in the additional task. The operation mechanism ("OF41" of FIG. 3) converts the access destination (logical data name) specified by the additional task to a physical data name on the basis of the data conversion table, and specifies the access destination (physical data name) in the device-unique function ("FD41" of FIG. 3.)

In "S103" of FIG. 6, the operation mechanism ("OF41" of FIG. 3) determines whether or not the main task is accessing the specified access destination. In a case where the operation mechanism determines that the main task is accessing, the operation mechanism waits until the access of the main task is completed.

In "S104" of FIG. 6, the operation mechanism ("OF41" of FIG. 3) reads out data (physical data) from the access destination (physical data name) in the device-unique function ("FD41" of FIG. 3), and converts the data to logical data on the basis of the data conversion table. In "S105" of FIG. 6, the converted data (logical data) is transmitted to the additional task of a requesting source.

Figure 7:
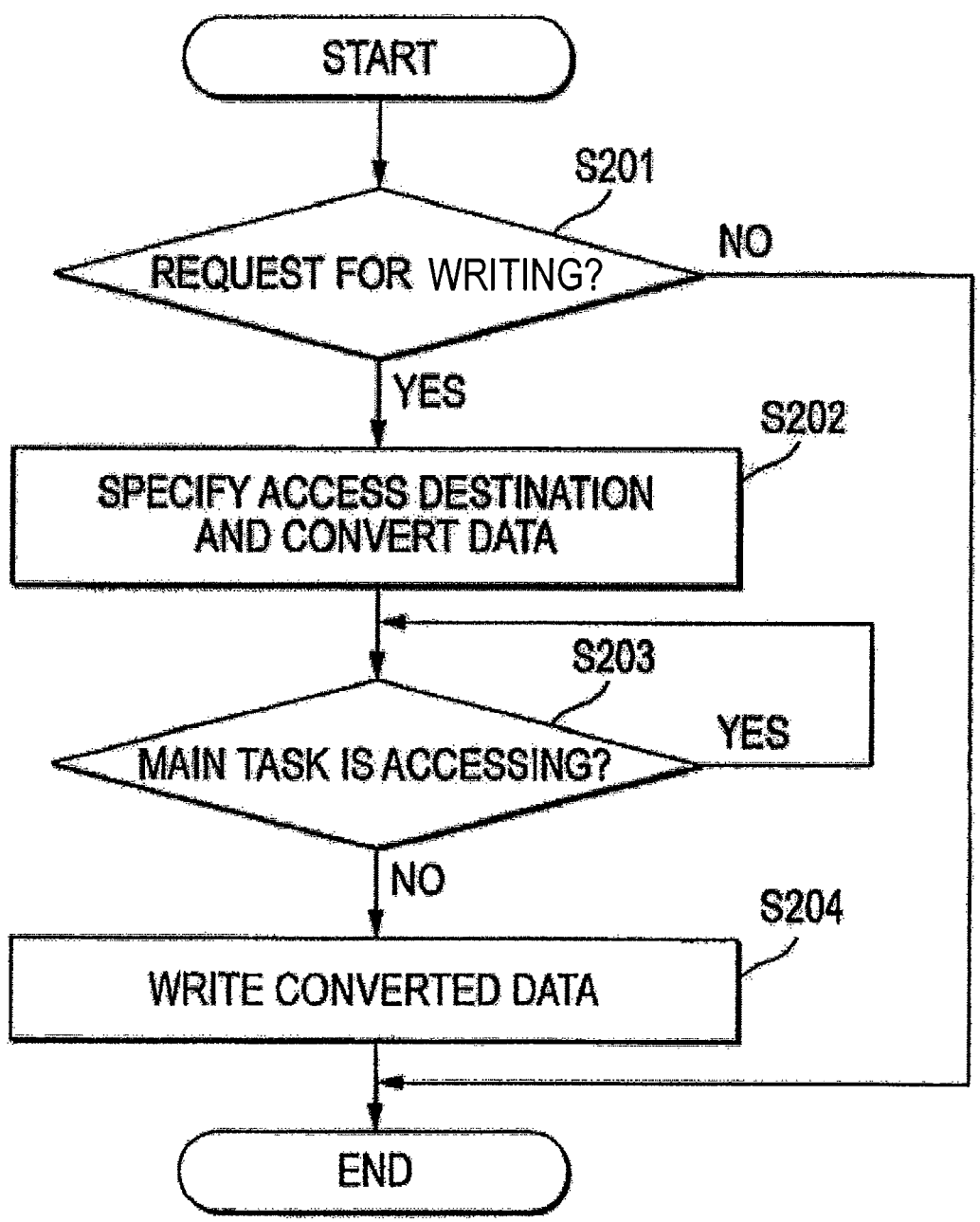
[FIG. 7] is a flow chart describing an operation of an operation mechanism.

In the same manner, in "S201" of FIG. 7, the operation mechanism ("OF41" of FIG. 3) determines whether or not there is a request for writing in data, which the device-unique function ("FD41" of FIG. 3) has, from the running additional task. In a case where the operation mechanism determines that there is the request for writing, the operation mechanism ("OF41" of FIG. 3) specifies an access destination in the device-unique function ("FD41" of FIG. 3), and converts data to be written to physical data on the basis of the data conversion table in "S202" of FIG. 7.

More specifically, the operation mechanism ("OF41" of FIG. 3) converts the access destination (logical data name) specified by the additional task and the data to be written (logical data) to a physical data name and the physical data respectively on the basis of the data conversion table. Then, the operation mechanism specifies the access destination (physical data name) in the device-unique function ("FD41" of FIG. 3), and creates converted data to be written (physical data).

In "S203" of FIG. 7, the operation mechanism ("OF41" of FIG. 3) determines whether or not the main task is accessing the specified access destination. In a case where the operation mechanism determines that the main task is accessing, the operation mechanism waits until the access of the main task is completed.

In "S204" of FIG. 7, the operation mechanism ("OF41" of FIG. 3) writes the converted data (physical data) in the access destination (physical data name) in the device-unique function ("FD41" of FIG. 3.)

As a result, since the operation mechanism ("OF41" of FIG. 3) allows the main task to preferentially access to the data in a case where the additional task accesses to the data in a device-unique function ("FD41" of FIG. 3), the influence on the main task caused by the operation of the additional task can be avoided.

Figure 8:
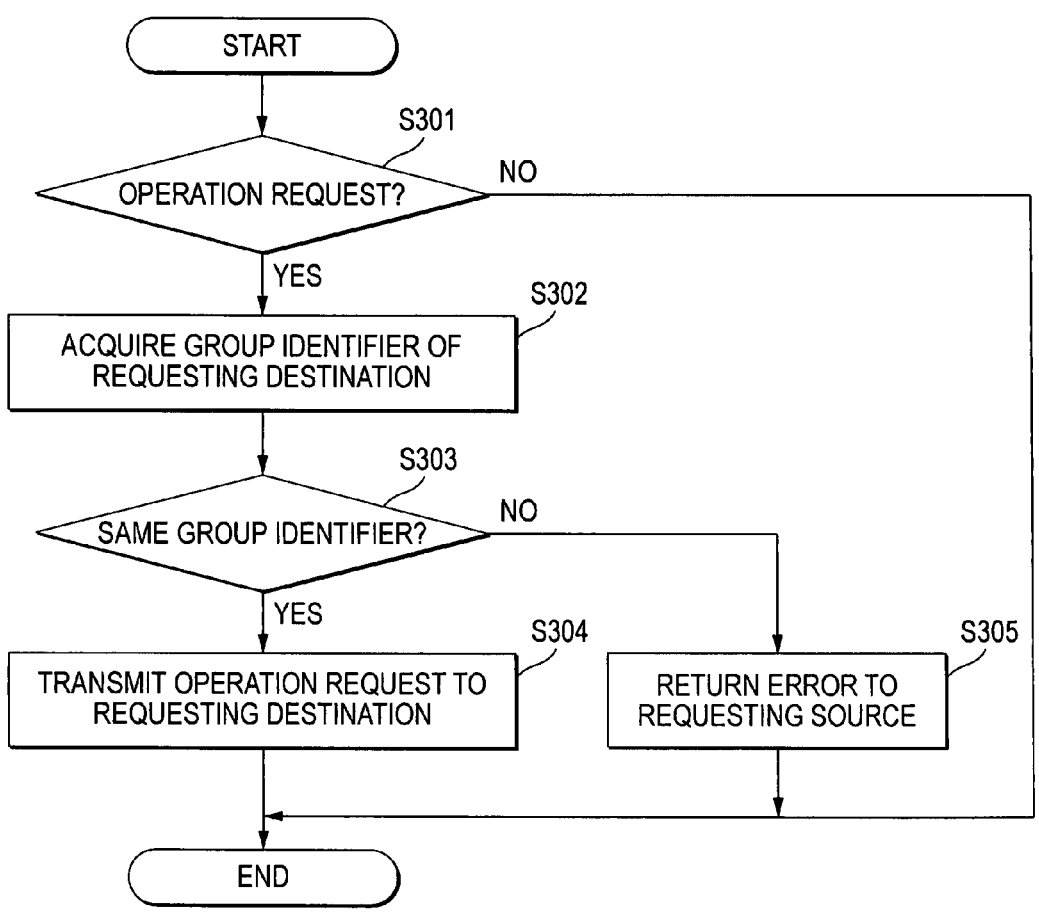
[FIG. 8] is a flow chart describing an operation of an operation mechanism.

In "S301" of FIG. 8, the operation mechanism ("OF41" of FIG. 3) determines whether or not there is an operation request from the running additional task to other additional task. Here, the operation request is setting of an operating parameter of other additional task; an operation of creation, start, halting and deletion of other additional task; transmission and reception of data with the other additional task (communication with the other additional task); or the like.

For example, in a case of giving the operation request shown as "RQ51" of FIG. 9 from the additional task shown as "AA51" of FIG. 9 to the additional task shown as "AA53" of FIG. 9, the additional task shown as "AA51" of FIG. 9 does not directly transmit the operation request to the additional task shown as "AA53" of FIG. 9, rather transmits the operation request to the operation mechanism ("OF51" of FIG. 9) as shown as "SQ51" of FIG. 9.

In a case where the operation mechanism determines that there is the operation request in "S301" of FIG. 8, the operation mechanism ("OF41" of FIG. 3) acquires a group identifier of the additional task of an operation requesting destination from the list of the group identifiers in "S302" of FIG. 8.

In "S303" of FIG. 8, the operation mechanism ("OF41" of FIG. 3) determines whether or not the group identifier of the additional task of an operation requesting source and the group identifier of the additional task of the operation requesting destination are the same identifiers.

In a case where the operation mechanism determines that the two group identifiers are the same identifiers in "S303" of FIG. 8, the operation mechanism ("OF41" of FIG. 3) transmits the operation request to the additional task of the operation requesting destination in "S304" of FIG. 8.

For example, in a case where the group identifier of the additional task of the operation requesting source ("AA51" of FIG. 9) and the group identifier of the additional task of the operation requesting destination ("AA53" of FIG. 9) are determined to be the same identifiers, the operation mechanism transmits the operation request to the additional task of the operation requesting destination ("AA53" of FIG. 9) as shown as "SQ52" of FIG. 9.

In a case where the operation mechanism determines that the two group identifiers are not the same identifiers in "S303" of FIG. 8, the operation mechanism ("OF41" of FIG. 3) returns an error to the additional task of the operation requesting source in "S305" of FIG. 8.

For example, in a case where the group identifier of the additional task of the operation requesting source ("AA51" of FIG. 9) and the group identifier of the additional task of the operation requesting destination ("AA53" of FIG. 9) are determined to be different identifiers, the operation mechanism returns the error to the additional task of the operation requesting source ("AA51" of FIG. 9) as shown as "ER51" of FIG. 9.

As a result, in a case where there is the operation request from the additional task to the other additional task, the operation mechanism ("OF41" of FIG. 3) permits transmitting the operation request only when the group identifier of the additional task of the operation requesting source and the group identifier of the additional task of the operation requesting destination are the same identifiers. For that reason, the independence among the different group identifiers can be secured.

Specifically, since association of a plurality of the additional tasks managed by the same group identifier can be handled as a virtual system independent of association of a plurality of additional tasks managed by other group identifier, the virtual systems do not interfere with each other.

For that reason, a user who operates one virtual system can completely independently use the virtual system without considering at all the other virtual system's operation or inoperation, operation condition, or the like.

In such case, even when the group identifier of the additional task of the operation requesting source ("AA51" of FIG. 9) and the group identifier of the additional task of the operation requesting destination ("AA53" of FIG. 9) are determined to be different identifiers, the operation mechanism may only not permit the operation request, and the error may not be necessarily transmitted.

According to the embodiment shown in FIG. 1 and the like, there is provided an operation mechanism handled as a single independent execution unit such as a task and a process, from a viewpoint of the execution environment (for example, an OS) included in the device-unique function. In other words, the main task and the operation mechanism are respectively handled as the single independent execution unit. However, there may be a change in assigned time for CPU or an occupation right to resources, etc., by giving the priority order to both the main task and the operation mechanism.

In such case, by setting the priority order of the main task higher than the priority order of the operation mechanism, the influence on the main task caused by the operation of the additional task can be further avoided.

The operation mechanism ("OF41" of FIG. 3) controls priority for each group identifier of the operating additional task, and thus it is possible to control priority in the above-mentioned virtual system unit. In addition, the operation mechanism ("OF41" of FIG. 3) may also control priority for each operating additional task.

In a case of loading a new additional task, the operation mechanism ("OF41" of FIG. 3) prepares different name spaces for respective group identifiers, and loads the new additional task into the name spaces respectively to execute the task. For that reason, a plurality of identical additional tasks can be executed independently of each other.

In such case, since the new additional task can be used independently among the group identifiers, the independence among the virtual systems (different group identifiers) can be further improved.

In general, the additional task is assigned in one group identifier (virtual system). However, for the additional task which provides a common function, the additional task may be assigned in two or more group identifiers (two or more virtual systems).

In such case, the additional task has a plurality of group identifiers, and the operation requests to the other additional tasks belonging to the respective virtual systems become available.

As for the additional task which provides a common function, a data compressing function, a data encoding function, a mail transmitting function for notifying an alarm, a function for monitoring whether or not a data value exceeds a threshold value, or the like may be considered.

In a case of providing resources to the additional task, for example, in a case of providing a file in a storage section to the additional task, the operation mechanism ("OF41" of FIG. 3) may manage so that different resources of the hardware resources are used even when the same name (file name) is used among the additional tasks of different group identifiers.

Specifically, in a case where an additional task (group identifier: 2) accesses a certain file ("file A in a directory A": path name (¥A¥A.file)), the operation mechanism ("OF41" of FIG. 3) acquires the group identifier of the additional task and accesses the file by using an extended path name (¥2¥A¥A.file) in which the group identifier is added to the path name (¥A¥A.file).

Even for the files having the same file name (path name (¥A¥A.file)), the extended path name (¥group identifier¥A¥A.file) may be a completely different path name when the group identifier is different. For that reason, overlapping of the resources do not occur and the independence among the virtual systems (different group identifiers) can be further improved.

According to the description of the embodiment shown in FIG. 1, particularly, to the description thereof with reference to FIG. 9, there is described an operation request among a plurality of the additional tasks operated in a single field device. However, the operation request may be applied to the additional tasks being operated in each of a plurality of the field devices sharing the group identifiers and being connected to a network 100.

That is, as shown in FIG. 10, an operation from an additional task operated in one field device to an additional task operated in the other field device when two devices, a "field device A" and a "field device B" exist is assumed.

In FIG. 10, "FD61", "OF61", and "AA61", "AA62" and "AA63" are a device-unique function, an operation mechanism, and a group of additional tasks (specifically, the group of the additional tasks having group identifiers 1, 2, and 3, respectively) of the "field device A", respectively.

In addition, in FIG. 10, "FD62", "OF62", and "AA64", "AA65" and "AA66" are a device-unique function, an operation mechanism, and a group of additional tasks (specifically, the group of the additional tasks having group identifiers 1, 2, and 3, respectively) of the "field device B", respectively.

Here, since the two "field device A" and "field device B" share the group identifiers, the additional tasks shown as "AA61" and "AA64" in FIG. 10 which belong to the group identifier "1" form one virtual system.

In the same manner, the additional tasks shown as "AA62" and "AA65" of FIG. 10 which belong to the group identifier "2", and the additional tasks shown as "AA63" and "AA66" of FIG. 10 which belong to the group identifier "3" form the virtual systems respectively.

For example, in a case of giving the operation request (communication) shown as "VC61" of FIG. 10 from the additional task (group identifier: 2) shown as "AP61" of FIG. 10 to the additional task (group identifier: 2) shown as "AP62" of FIG. 10, a communication as shown as "RC61" of FIG. 10 is carried out.

That is, the additional tasks shown as "AP61" and "AP62" of FIG. 10 do not directly communicate with each other, rather an operation mechanism of the "field device A" shown as "OF61" of FIG. 10 which receives a request from the additional task shown as "AP61" of FIG. 10 transmits the operation request (communication) by using a device-unique function of the "field device A" shown as "FD61" of FIG. 10 via a network, to a device-unique function of the "field device B" shown as "FD62" of FIG. 10. Then, the operation request (communication) is transmitted to the additional task shown as "AP62" of FIG. 10 via the operation mechanism of the "field device B" shown as "OF62" of FIG. 10, thereby implementing a virtual operation request (communication) as shown as "VC61" of FIG. 10.

By applying the present invention to the additional tasks respectively operated in the plurality of the field devices sharing the group identifiers and being connected by the network 100, a virtual system formed of a plurality of layers as shown in FIG. 11 can be implemented.

In FIG. 11, "SN71", "SN72", and "SN73" are the main tasks of the respective sensors as the field devices; "CT71" and "CT72" are the main tasks of the respective controllers as the field devices; and "SV71" is the main task of the server as the field device.

Specifically, in a case of assuming the system exemplified in FIG. 11 as a manufacturing system, tasks for running the system as the manufacturing system are the main tasks required for the field devices such as the sensor, the controller and the server.

In FIG. 11, each ellipse connected by dashed lines (vertical lines) is the additional task added to the individual field device, and the additional tasks having the same group identifier are associated with each other by the operation requests shown as thick solid lines.

In addition, "GP71", "GP72" and "GP73" are virtual systems which are divided independently with each other by different group identifiers. The additional tasks operated in the respective field devices belong to the respective virtual systems (same group identifier) in accordance with the list of the group identifiers.

Specifically, for example, "GP71" of FIG. 11 is the virtual system to which the additional task required for an energy monitoring system in the manufacturing system belongs; "GP72" of FIG. 11 is the virtual system to which the additional task required for a sensor collective-security system in the manufacturing system belongs; and "GP73" of FIG. 11 is the virtual system to which the additional task required for a monitoring system focused on the specific device in the manufacturing system belongs.

In a configuration shown in FIG. 11, since the virtual systems do not interfere with each other as mentioned above, a user, who operates the virtual system shown as "GP71" in FIG. 11 to which the additional task required for the energy monitoring system belongs, can completely independently use the virtual system (energy monitoring system) without considering at all the operation or inoperation, the operation condition, or the like of the other virtual systems (sensor collective-security system or the monitoring system focused on the specific device).

As mentioned above, in a case of loading a new additional task to each virtual system (same group identifier), different name spaces are prepared for each of the group identifiers, and the new additional task is loaded into the name space to execute the task. For that reason, it is possible to use the same additional task even though among the different group identifiers. Even though the same file name (relative path name (¥A¥A.file)) is used, the extended path name (¥group identifier¥A¥A.file) becomes a completely different path name when the group identifier is different. For that reason, overlapping of the resources does not occur and the independence among the virtual systems (different group identifier) can be further improved.

According to the description of the embodiment shown in FIG. 1, there is described that the operation mechanism ("OF41" of FIG. 3) permits the operation request only when the group identifier of the additional task of the operation requesting source and the group identifier of the additional task of the operation requesting destination are the same identifiers in a case where there is the operation request from the additional task to the other additional task. However, not only for the request from the additional task but also for the operation request from a user, the operation mechanism ("OF41" of FIG. 3) may determine whether the operation request is proper or improper by authenticating the user's access authority or the like.

In such case, it is possible to block an improper operation request from the user who does not have access authority, thereby improving security.

In the above-mentioned user authentication, the operation mechanism of each field device has to carry out the user authentication. Depending on the number of the field devices, the system becomes complicated since the authentication information such as a user name, a password, an operational object and an authorized operation have to be managed individually.

Figure 12:
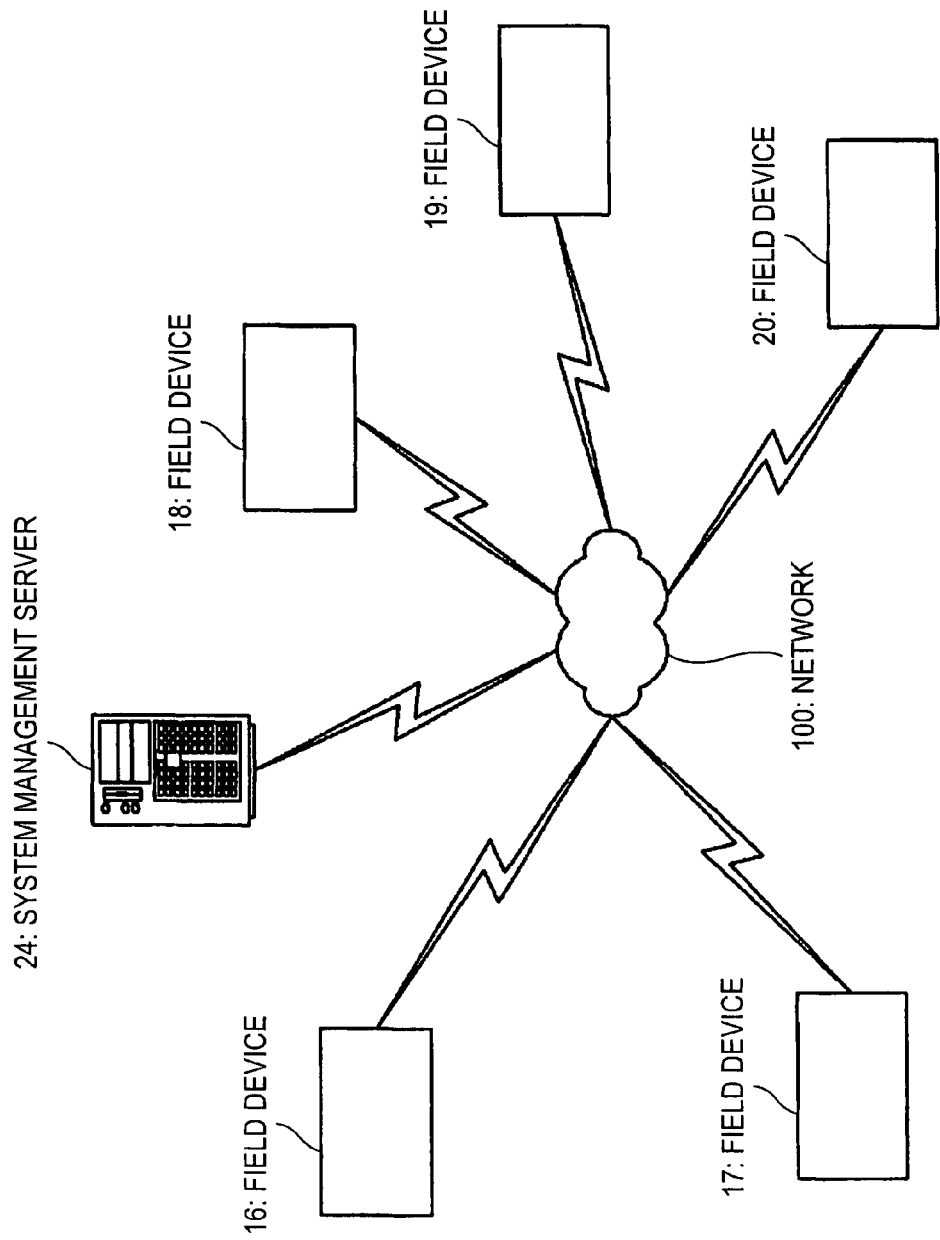
[FIG. 12] is a configuration block diagram showing another embodiment of a system which manages authentication information collectively.
Figure 14:
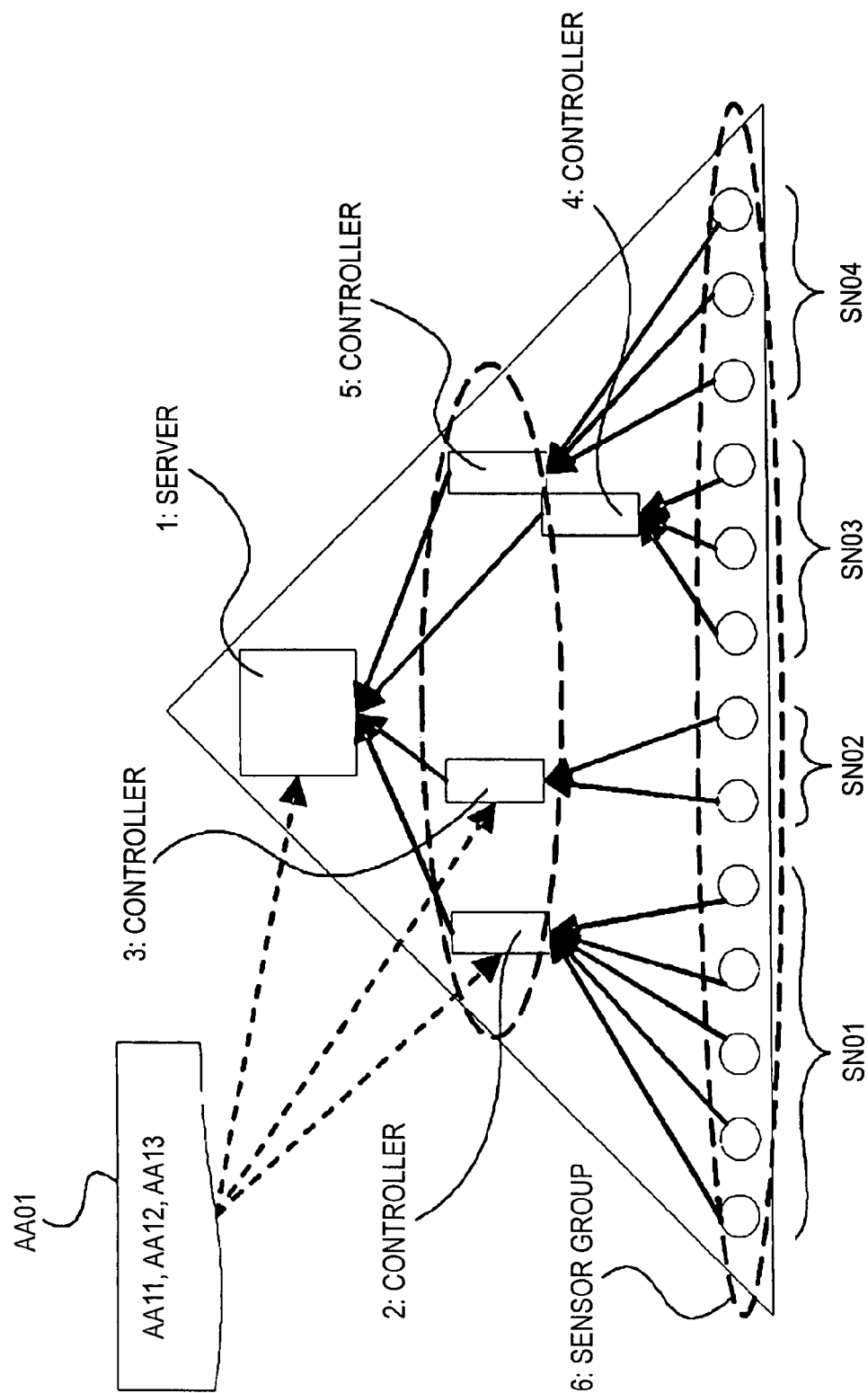
[FIG. 14] is a configuration block diagram showing one example of a system of a related art, in which field devices are connected to each other via a network.
Figure 15:
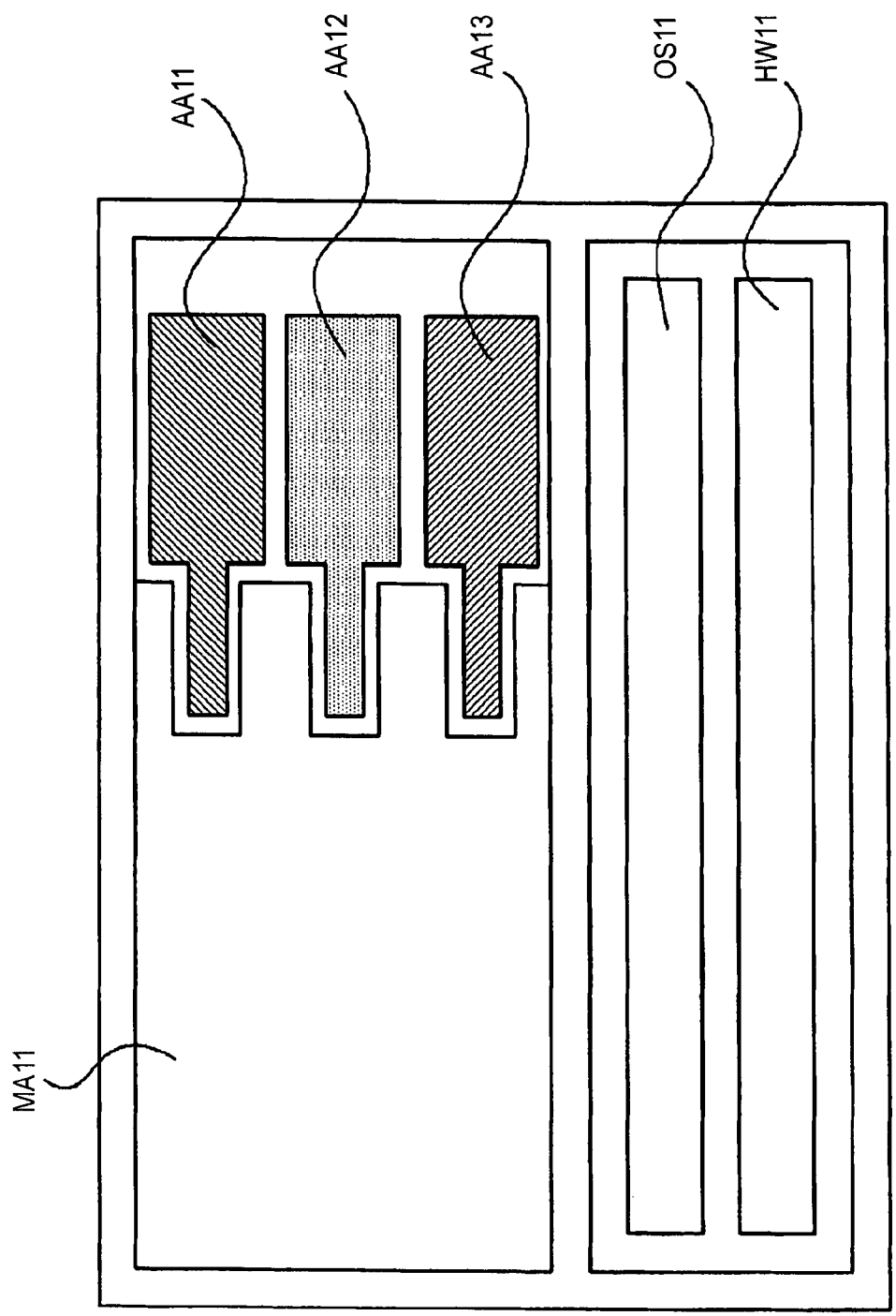
[FIG. 15] is an explanatory diagram showing relation among a main task operated in a field device, an execution environment for executing the main task and hardware resources.
Figure 16:
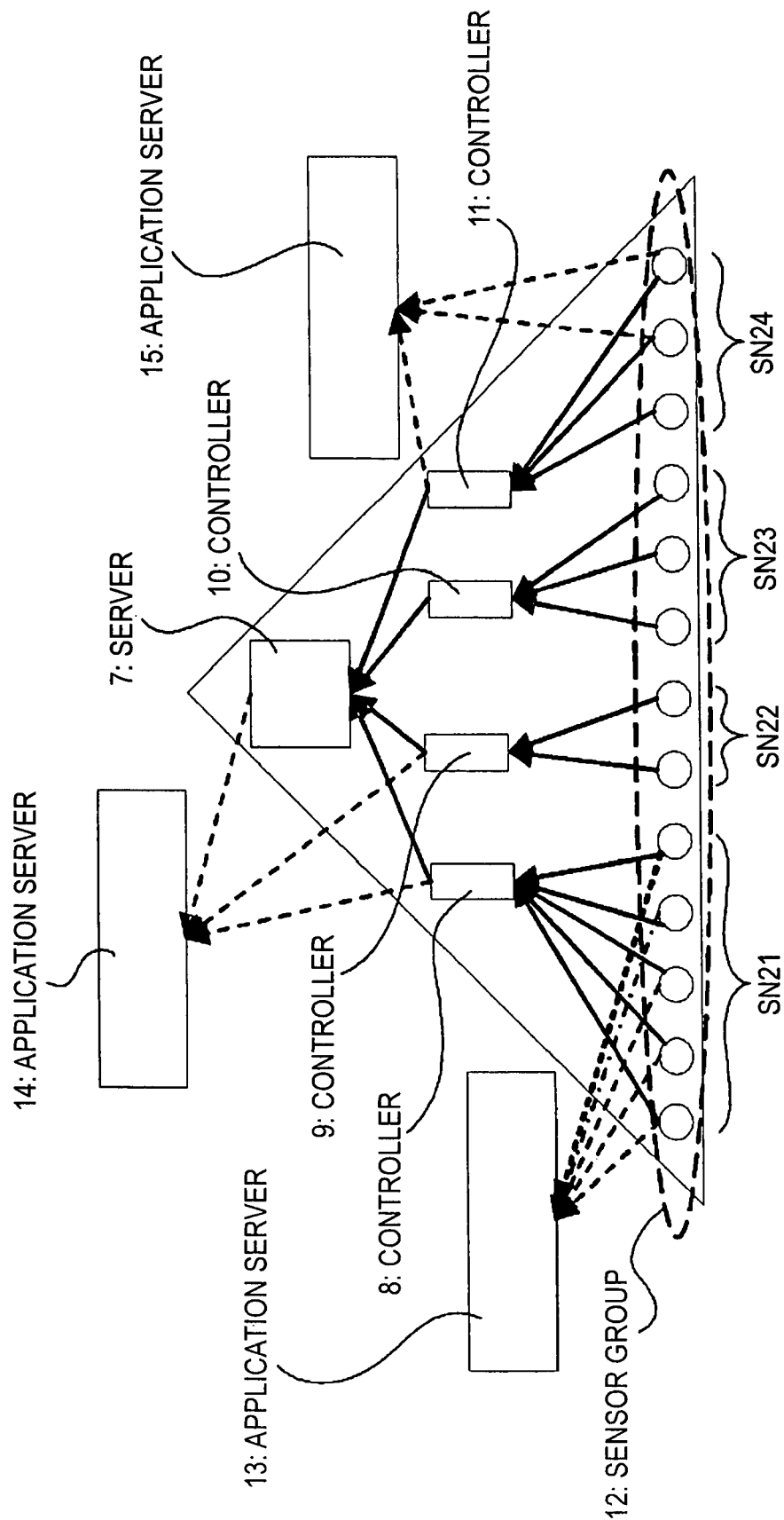
[FIG. 16] is a configuration block diagram showing another example of a system of a related art, in which a plurality of the field devices is connected to each other via a network.

FIG. 12 is a configuration block diagram showing another embodiment of a system which collectively manages such authentication information. In FIG. 12, reference numerals 16, 17, 18, 19, 20 and 100 are the same reference numerals as those in FIG. 1; and reference numeral 24 is a system management server which collectively manages the authentication information.

The field devices 16, 17, 18, 19, and 20 are connected to each other via the network 100, and the system management server 24 is also connected to the network 100.

Here, an operation of the other embodiment shown in FIG. 12 will be described with reference to FIG. 13. FIG. 13 is an explanatory diagram showing one example of the authentication information managed in the system management server 24.

As shown in FIG. 13, there is described a user identifier, a user name, and a password as for the authentication information managed in the system management server 24, and also described the group identifier of the operational object and the authorized operation that are permitted with respect to the user identifier.

For example, when the user identifier of the user is "1" as a result of the user authentication in the system management server 24, the user may be permitted to operate all of creation, start, halting and deletion of the additional task to be included in the virtual system which includes the additional tasks belonging to the group identifier "1".

In addition, for example, when the user identifier of the user is "3" as a result of the user authentication in the system management server 24, the user may be permitted to operate the two virtual systems which includes the additional tasks belonging to the group identifiers "1" and "3", but the user is permitted only to operate the halting of the additional tasks included in the two virtual systems.

As a result, by providing the system management server 24 which collectively manages the authentication information, it becomes unnecessary to individually perform the complicated authentication information management in each of the field devices. In a case of changing the authentication information, only the authentication information of the system management server 24 can be changed without changing the individual authentication information on the field devices.

The invention claimed is:

1. A field device connected to a network, the field device comprising:
   a storage section;
   a communication section for performing communication via the network; and
   an arithmetic control section for controlling the field device entirely by executing a main task under an execution environment, and controlling an independent operation mechanism that starts a first and a second additional task independently of a device-unique function, where the device-unique function comprises the main task, the execution environment, and a hardware resource,
   wherein the independent process operation mechanism assigns a first .group identifier, a first unique address space and a first unique name space to the started first additional task, and assigns a second group identifier, a second unique address space and a second unique name space to the started second additional task,
   wherein the independent operation mechanism is configured to receive an operation request from the first additional task to the second additional task,
   wherein if the independent operation mechanism receives the operation request from the first additional task to the second additional task, and determines that the first group identifier and the second group identifier are the same, the independent operation mechanism transmits the operation request to the second additional task, and
   if the independent operation mechanism receives the operation request from the first additional task to the second additional task, and determines that the first group identifier and the second group identifier are not the same, the independent operation mechanism returns an error to the first additional task.

2. The field device according to claim 1, wherein the independent operation mechanism controls the first and the second additional tasks being started.

3. The field device according to claim 1, wherein the independent operation mechanism specifies an access destination in the device-unique function in response to a request from a running additional task, for reading data held by the device-unique function,
   when the main task is accessing the specified access destination, the independent operation mechanism waits until the access of the main task is completed, and
   the independent operation mechanism reads out physical data from the access destination, converts the read physical data to logical data on the basis of a data conversion table, and transmits the converted logical data to the running additional task.

4. The field device according to claim 1,
   wherein the independent operation mechanism specifies an access destination in the device-unique function in response to a request from a running additional task, for writing in data held by the device-unique function, and converts logical data to write in to physical data on the basis of a data conversion table,
   when the main task is accessing the specified access destination, the independent operation mechanism waits until the access of the main task is completed, and the independent operation mechanism writes the converted physical data in the specified access destination.

5. The field device according to claim 1, wherein the execution environment provides priority order to the main task and the independent operation mechanism.

6. The field device according to claim 1, wherein the independent operation mechanism provides priority order to each group identifier.

7. The field device according to claim 1, wherein the independent operation mechanism provides priority order to each additional task.

8. The field device according to claim 1, wherein upon loading a new additional task, the independent operation mechanism prepares a different name space for each group identifier, and loads the new additional task into the name space to execute the task.

9. The field device according to claim 1, wherein upon providing the hardware resources to the additional task, the independent operation mechanism manages so as to use different resources of the hardware resources even though the same name is used between the first and second additional tasks to which different group identifiers are assigned.

10. The field device according to claim 9, wherein when the first or second additional task requests an access to a certain path name, the independent operation mechanism acquires the group identifier of the additional task and accesses by using an extended path name in which the group identifier is added to the path name.

11. The field device according to claim 1, wherein the independent operation mechanism determines whether an operation request is proper or improper in response to the operation request from a user, and authenticates an access authority of the user.

12. A field system comprising:
a first storage section;
a first communication section for performing communication via the network; and
a first arithmetic control section for controlling the first field device entirely by executing a first task, and controlling a first independent operation mechanism that starts the first task independently of a device-unique function of the first field device,
wherein the first independent operation mechanism assigns a first group identifier, a first unique address space and a first unique name space to the first task, a second field device connected to the first field device through the network, the second field device comprising:
a second storage section;
a second communication section for performing communication via the network; and
a second arithmetic control section for controlling the second field device entirely by executing a second task, and controlling a second independent operation mechanism that starts the second task independently of a second device-unique function of the second field device, wherein the second independent operation mechanism assigns a second group identifier, a second unique address space and a second unique name space to the second task,
wherein if the first independent operation mechanism receives an operation request from the first task to the second task, and determines that the first group identifier and the second group identifier are the same, the first independent operation mechanism transmits the operation request to the second task through the network, and
if the first independent operation mechanism receives the operation request from the first task to the second task, and determines that the first group identifier and the second group identifier are not the same, the first independent operation mechanism returns an error to the first task.

13. A field device connected to a network, the field device comprising:
a first storage section;
a communication section for performing communication via the network; and
a arithmetic control section for controlling the field device entirely by executing a first task and a second task, and controlling an independent operation mechanism that starts the first task and the second task independently of a device-unique function of the first field device, wherein the device-unique function comprises a main task, an execution environment, and a hardware resource,
wherein the independent operation mechanism assigns a first group identifier, a first unique address space and a first unique name space to the first task,
wherein the independent operation mechanism assigns a second group identifier, a second unique address space and a second unique name space to the second task,
wherein, if the independent operation mechanism receives the operation request from the first additional task to the second additional task, and determines that the first group identifier and the second group identifier are the same, the independent operation mechanism transmits the operation request to the second additional task, and
if the independent operation mechanism receives the operation request from the first additional task to the second additional task, and determines that the first group identifier and the second group identifier are not the same, the independent operation mechanism returns an error to the first additional task,
wherein the independent operation mechanism provides priority order to each group identifier.

* * * * *